3,098,191
MULTIPLE PURPOSE GENERATOR
Clyde F. Cavert, Menasha, and Russell E. Hall and Earl W. Schabo, Appleton, Wis., assignors to Miller Electric Manufacturing Company, Inc., Appleton, Wis., a corporation of Wisconsin
Filed June 27, 1960, Ser. No. 39,130
19 Claims. (Cl. 322—79)

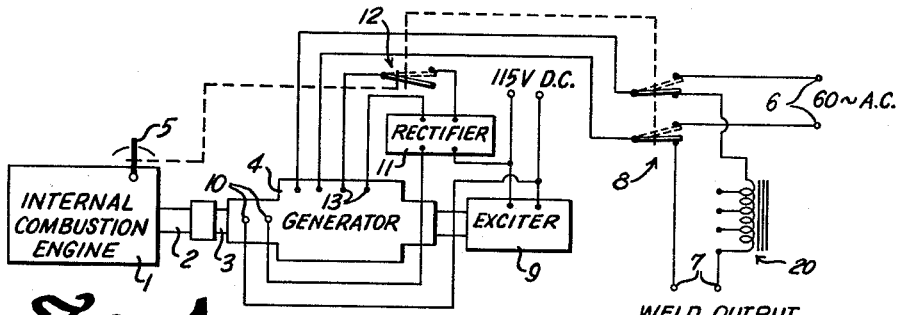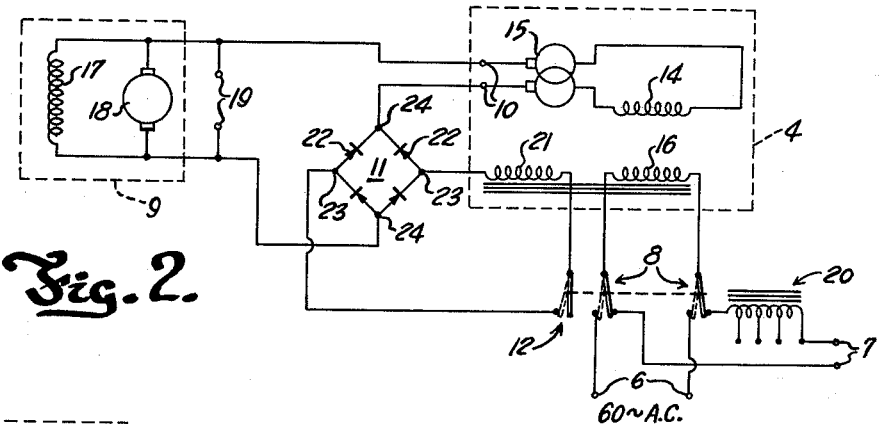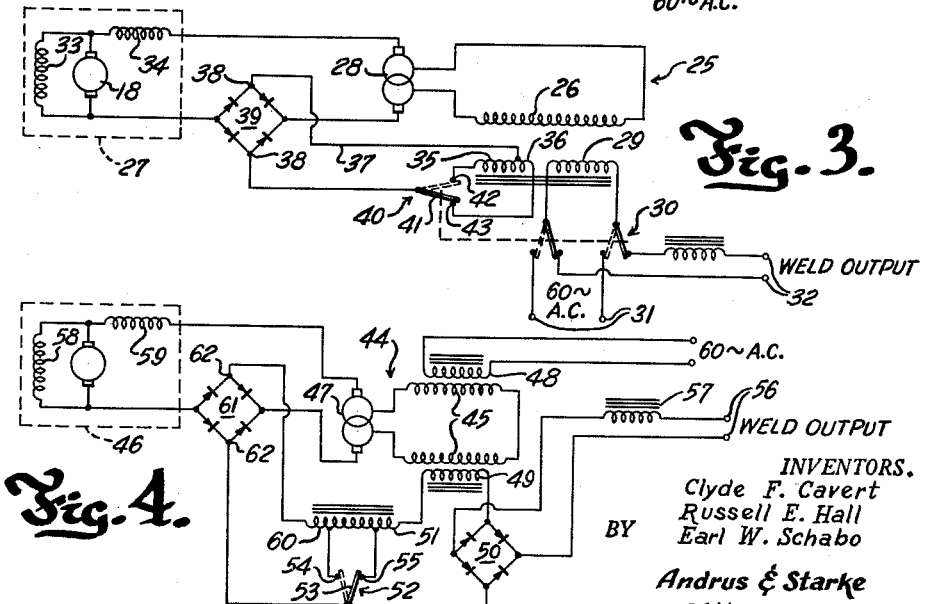

This invention relates to a generator having a separate field exciter coupled to the generator for synchronous rotation and adapted to be driven at one or more speeds and adapted to establish various outputs to establish a multiple purpose generator.

Engine-driven generators have been employed as a mobile arc current source for field use and the like. A revolving field generator driven by a conventional internal-combustion engine is particularly suitable for establishing a stable arc for welding. A small direct current (D.C.) exciter which is driven by the same engine and carried by the generator shaft provides a very satisfactory source of D.C. excitation of the generator's revolving field.

Such generators are employed with different current ranges and are also being employed as a standby power supply for providing the conventional 60 cycle power current. A separate exciter designed for a given speed or output characteristic does not provide optimum field excitation at a different speed or output characteristic.

At any given speed, the field excitation and the power output require a particular relationship for proper generator operation. If the speed is changed, at least one of the above design features must be readjusted. If the speed is held constant and the output characteristic is changed, the field excitation must be adjusted accordingly to maintain proper and efficient generator operation.

An engine-driven generator employed as a conventional standby power supply must practically be operated at a speed providing a current having a frequency of 60 cycles per second or some other preselected frequency in accordance with the conventional power distribution system of the local utilities. Further, the output voltage is practically required to be 115 volts or 230 volts A.C. power.

When the generator is employed to furnish arc welding current, the generator may be designed to operate at the same speed or at a somewhat higher speed in order to establish a somewhat higher frequency current which aids the stabilization of the arc. The output open circuit voltage for welding is normally only 80 volts.

The exciter may be designed to provide proper excitation at the higher speed. The lower speed of the generator when employed as a power source or the like similarly affects the output of the D.C. exciter. The output of the D.C. exciter and the revolving field excitation is consequently reduced proportionately and the power rating of the unit as a power plant is substantially reduced. The driving engine is then also being operated far below full capacity and in a relatively inefficient range.

Separately excited generators have been proposed establishing full excitation when operating at the lower speed corresponding to the conventional power output. At higher operating speeds for arc welding and the like, the exciter output is above optimum. Resistance is selectively added into the field circuit of the exciter and reduces the exciter output in a manner to maintain proper or optimum excitation of the revolving field of the generator. Although optimum excitation for operation of the generator can be thus obtained, the exciter is then operating on the straight line portion of the magnetization curve and on a relatively weak field. The regulation of the exciter is consequently very poor.

The construction of a line of generators including generators for dual functioning with certain output characteristics and others with a different output characteristic and generators only for arc welding and the like has necessitated completely separate designs of a separate exciter with some modifications reducing the number of different designs required or the use of other excitation sources.

The present invention is directed to a multi-purpose generator having a revolving field excitation circuit including voltage compensation means to allow use of a base-designed exciter for generators having a varying speed or a varying output.

Generally, in accordance with the present invention, a multiple purpose generator such as a combined arc welding and power supply generator includes a revolving field excited from a base-designed exciter. An excitation compensation circuit is operated from the output of the main generator as a power source and adapted to be selectively connected in series circuit with the output of the self-exciter to add or remove excitation from the revolving field. The circuit is pre-connected to compensate for any under- or over-excitation established by the exciter itself. Therefore, the exciter may be designed to operate with a well-regulated output and the main generator operated at proper excitation for the various speeds, power ratings and the like.

In accordance with another aspect of the present invention, the exciter is designed to establish the proper excitation voltage when the generator is employed as an arc welding current source or the like establishing an output of a frequency greater than desired when employed as a power supply. When the generator is employed as a conventional power supply, the generator speed is reduced to provide the proper frequency output and the exciter voltage is allowed to drop accordingly. To establish optimum excitation of the revolving field, a booster winding is coupled to the rotating field of the generator and connected in a series circuit with the output of the exciter voltage and the revolving field by a suitable rectifying means. The voltage of the booster winding is added to the reduced exciter voltage to maintain full field excitation. In the arc welding position, the booster winding is completely disconnected from the circuit and the apparatus operates in the conventional manner.

In accordance with another aspect of the present invention, a full-wave bridge rectifier connects the booster winding into the exciter circuit. The rectifier is biased to conduct the current from the D.C. exciter and consequently constitutes a direct connection across the booster winding for the current flowing from the D.C. exciter. Consequently, to connect and disconnect the effect of the booster winding it is merely necessary to insert a switch in the input circuit to the full-wave rectifier.

In accordance with still another aspect of the present invention, separate power and welding generator output windings are provided on the main generator which is designed to operate at the same speed for supplying power and for arc welding. The separate output windings eliminate the necessity for a somewhat complicated changeover switch.

In the conventional multiple purpose machine, a single output winding is provided with various portions of the winding connected in one or more configurations to establish the desired output voltage. This form of the invention is particularly useful where only a D.C. welding output is desired and the frequency of the generator output is not therefore as important and can readily be the same as power supply frequency. A control induuctance is connected in series with the welding winding in accordance with known practice. The exciter is designed to provide proper excitation of the generator in the power supply position. A compensating circuit is energized from the control inductance and connected in series circuit with the output of the exciter to provide proper excitation with an increased power rating for welding.

The present invention provides a multiple purpose separately excited generator such as a combination arc welding and power supply generator including a field excitation compensation means for readily and conveniently establishing proper field excitation at different speeds and/or power ratings. The field excitation compensation means of the present invention is simple to construct and adjust and is therefore economically and commercially practicable. The present invention thus provides a very simple and ready means of changing the frequency or power output of a revolving field generator while maintaining proper excitation of the field.

The drawings furnished herewith illustrate the best mode presently contemplated for carrying out the invention.

In the drawings:

FIG. 1 is a diagrammatic illustration of an engine-driven revolving field generator including a separate D.C. exciter and adapted for selectively supplying an A.C. arc welding current and a conventional A.C. power supply current;

FIG. 2 is a schematic circuit diagram of the exciter and the revolving field generator shown in FIG. 1;

FIG. 3 is a schematic circuit diagram similar to FIG. 1 with a compensating field excitation circuit for providing proper excitation in both the power supply connection and the arc welding connection of a generator having a base-designed separate exciter; and FIG. 4 is a schematic circuit diagram similar to FIGS. 2 and 3 for a generator having a separate power supply winding and an arc welding winding with a compensating circuit operative when arc welding.

Referring to the drawings and particularly to FIG. 1 an internal-combustion engine 1 includes an output shaft 2 which is connected to drive a generator shaft 3 of an A.C. generator 4. A throttle control 5 is provided on engine 1 for setting the operating speed of the engine. A.C. power terminals 6 and A.C. welding terminals 7 are respectively connected to the output of the generator 4 by a double-pole, double-throw switch 8 to allow corresponding use of the generator 4. A small D.C. exciter 9 is carried by the generator shaft 3 and establishes a D.C. output which is connected to the revolving field, not shown in FIG. 1, of the generator 4 by suitable slip ring connections 10. The D.C. exciter 9 is selected to establish correct excitation of the generator 4 with the throttle control 5 of engine 1 set for supplying arc welding current to the A.C. weld terminals 7.

A compensating field excitation rectifier 11 is connected with its output in series with the output of the exciter 9 and the revolving field of the generator 4. A switch 12 selectively connects an auxiliary output connection 13 from the generator 4 to the input of rectifier 11 as more fully described hereinafter. The switch 12 is preferably ganged with switch 8 to open the circuit when the switch 8 is placed in the welding position as shown in full line in FIG. 1. Switch 12 then completes the circuit from the generator 4 only when switch 8 connects the A.C. power terminals 6 to the main output of the A.C. generator 4.

The internal-combustion engine 1, as previously noted, is of any suitable or standard construction and normally is a conventional gasoline or diesel fueled variety. The engine 1 includes the usual speed sensitive means, not shown, to maintain a constant output drive in accordance with the setting of the throttle control 5. However, any other suitable prime mover which has a sufficient power capacity to drive the A.C. generator 4 can be employed.

The A.C. generator 4 is schematically shown in FIG. 2 as a revolving field type generally including a revolving field 14 which is wound upon a rotor, not shown, and thus rotatably carried on the generator shaft 3. Conventional slip rings 15 are provided on the rotor and connected to terminals 10 to connect the revolving field 14 to the output of the D.C. exciter 9. A generator stator or output winding 16 is mounted as a part of the stationary frame of the generator 4 and constitutes the main output winding connected to the switch 8.

In the schematic circuit shown in FIG. 2, a single output stator winding 16 is illustrated for simplicity of explanation and illustration. In the power position, a 115 volt output is desirable and in the weld position an 80 volt output is desirable. A single winding 16 is illustrated for simplicity of description. In actual practice, a multi-coil winding is employed and carried by the stator structure, not shown, and suitably connected to provide the desired output voltage.

The magnetic coupling between the separately excited revolving field 14 and the stationary stator winding 16 induces an A.C. voltage in the stator winding 16. The speed of rotation of field 14 determines the frequency of the output current and the excitation of field 14 determines the capacity of the generator 4.

The D.C. exciter 9 is diagrammatically shown as a conventional D.C. generator having shunt field 17 for self-excitation of the exciter. The exciter 9 includes a split shunt field 17 connected in parallel with an armature 18. The armature 18 is carried by the generator shaft 3 establishing a direct current output supplying excitation to the shunt field 17 of exciter 9 and the revolving field 14 of generator 4.

A set of D.C. output terminals 19 are connected across the armature 18 of the exciter 9 to establish a low voltage D.C. output supply available for the operation of lights and appliances within the limited capacity of the exciter during a welding operation. This output is normally a standard voltage of 115 volts D.C. which also provides the desired excitation of the field 14.

The generator 4 is designed with a practical arc welding speed, such as approximately 3,000 r.p.m., to provide a current output of a frequency somewhat higher than the normal 60 cycles power and thus particularly adapted for field welding and the like.

The exciter 9 is designed to provide proper excitation for welding and switch 8 is in the full line position shown to connect the output terminals to the winding 16 for supplying arc welding current. A tapped reactor 20 is series connected in one of the lines between the terminals 7 and the generator 4 to allow adjustment of the welding current.

When switch 12 is moved from the weld terminals 7 to connect the A.C. power supply terminals 6 to the output of generator 4, the speed of the engine 1 is reduced to drive the generator at a speed which establishes the conventional 60 cycle output current. Four pairs of stator poles can be satisfactorily employed and the speed of generator 4 is then reduced to 1,800 r.p.m. for establishing the 60 cycle output by suitably positioning the throttle control 5.

The reduced speed of the generator 4 and consequently the exciter 9 substantially reduces the output voltage of the D.C. exciter 9. In practice, the voltage has dropped to approximately 60 volts. Such a reduced voltage for excitation of the revolving field 14 substantially lowers the capacity of the generator 4. The internal-combustion engine 1 now supplies only a small portion of the normally operating capacity of the engine 1 and the operation is relatively inefficient.

In accordance with the embodiment of the present invention illustrated in FIGS. 1 and 2, an auxiliary field compensating power take-off is provided from the generator 4 and connected in series with the exciter 9 through switch 12 and rectifier 11 during a power supply operation. The auxiliary power increases the excitation of the revolving field 14 to provide proper field excitation for maintaining the output capacity of the generator 4, as now described.

A booster winding 21 is wound upon the stator, not shown, in common with the output winding 16. A voltage is reflected or induced in the booster winding 21 by the rotating field 14 in accordance with generator action. The booster winding 21 provides an A.C. compensating excitation connection which is rectified and series connected in the excitation circuit for field 14 through the rectifier 11. Switch 12 selectively completes the circuit connection of the winding 21 to rectifier 11 incident movement of the main control switch 8 from the weld terminals 7 to the power supply terminals 6, as shown in the dotted position of switches 8 and 12 in FIGS. 1 and 2.

The rectifier 11 is illustrated as a conventional full-wave bridge rectifier including four half-wave rectifier units 22 connected and suitably polarized in the four arms of a bridge circuit. Input terminals 23 at opposite junctions within the bridge are each connected to an opposite end of the winding 21. Switch 12 is inserted in one connecting line to selectively make or break the circuit from the winding 21 to rectifier 11. Output terminal 24 at the opposite pair of junctions within the bridge are connected one to one side of the exciter 9 and one to a corresponding connection to the slip rings 15. The rectifier elements 22 are polarized to establish the low-resistance path in the direction of the normal current flow from the exciter 9 to the slip rings 15 and consequently the elements 22 function essentially as a direct connection from exciter 9 to slip rings 15.

With the switch 12 opened, the booster winding 21 is disconnected from the circuit and the generator 4 operates as if the rectifier 11 and the booster winding 21 were removed from the circuit.

With the switch 12 closed, the booster winding 21 is connected in a completed operative circuit across the input terminals 23 of the rectifier 11. The output voltage induced in the booster winding 21 establishes a boosting compensating A.C. voltage which is rectified and connected in series aiding with the excitation voltage from the D.C. exciter 9. The reduced voltage of the exciter 9 caused by the reduced operating speed of the engine 1 is thus compensated for by the voltage inserted from the booster winding 21. The total voltage applied across the slip rings 15 and the revolving field 14 is thus maintained at a proper and optimum level for excitation of the rotating field 14. Consequently, full power capacity is provided in the power supply setting.

The rectifier 11 is preferably designed to withstand the peak voltages established in windings 21 with the generator 4 in the weld setting. If the generator 4 is then inadvertently placed in the power supply setting and the internal-combustion engine set at welding speed, the relatively high voltages in winding 21 will not destroy the rectifier 11.

Rectifier 11 can also be protected by tieing the throttle 5 to the switch 12, as shown by the dotted coupling line in the drawing, to open and close the input to the rectifier in accordance with the positioning of throttle 5. The switch 12 is then only closed when the throttle 5 is in the power position and a relatively low voltage applied to rectifier 11.

In summary, the embodiment of the invention functions as follows:

Switches 8 and 12 are simultaneously positioned to connect either the power terminals 6 or the welding terminals 7 to the generator winding 16 and to accordingly connect and disconnect the winding 21 from rectifier 11. The throttle control 5 is positioned to establish the predetermined output speed.

In the welding position of the equipment, the exciter 9 provides the proper excitation of the revolving field 14 and the booster winding 21 is effectively disconnected from the circuit.

As previously noted, the exciter 9 and field 14 are selected to establish a 115 volt D.C. output of exciter 9 during a weld position. Terminals 19 then constitute a suitable power source for the operation of lights and small portable tools designed for direct current operation.

In the power supply conditioning of the equipment, exciter 9 provides only a portion of the necessary excitation voltage for optimum excitation of field 14. However, booster winding 21 is effectively connected in circuit and establishes a compensating voltage which aids the output of exciter 9 and establishes optimum excitation of field 14.

Referring particularly to FIG. 3 in the drawings, a second embodiment of the invention is shown with an excitation compensating circuit effectively connected in series with the exciter in both the power supply connection and the arc welding connection of the generator.

As in the embodiment of the invention, shown in FIGS. 1 and 2, a main generator 25 is provided which is adapted to be driven at an arc welding speed and a somewhat lower power supply speed. The generator 25 includes a revolving field 26 carried by the rotor, not shown, and connected for excitation to a separate exciter 27 by slip rings 28. The generator 25 includes an output winding 29 similar to winding 16 of FIG. 2. A control switch 30 selectively connects the winding 29 to power supply terminals 31 or welding terminals 32.

The separate exciter 27, in accordance with the embodiment shown in FIG. 3, is shown as including a shunt excitation field 33 and, in addition, a series excitation field 34. The exciter 27 is designed as a base unit for other type constructions such as subsequently described and is assumed to provide an undesirable field excitation for the power supply connection and the arc welding connection.

In accordance with the present invention as illustrated in FIG. 3, a power booster winding 35 and an arc welding booster winding 36 are wound upon the stator, not shown, in common with the output winding 29 and connected in series. A common lead 37 is connected to the junction of the series-connected windings 35 and 36 and to one of the input terminals 38 of a full-wave bridge rectifier 39.

The full-wave bridge rectifier 39 generally corresponds to the rectifier 11 shown in FIG. 2 and the opposite input terminal 38 is connected by a single-pole double-throw switch 40 to the free end of either booster winding 35 or 36.

The switch 40 includes a single switch arm or pole 41 connected to the opposite input terminal 38. The arm or pole 41 is adapted to be selectively connected to a power contact 42 which is connected to the free end of the power booster winding 35 or to an arc welding contact 43 which is connected to the free end of the arc welding booster winding 36. The switch arm or pole 41 is ganged to the corresponding actuating component of control switch 30 for similar corresponding positioning to the power contact 42 or the arc welding contact 43.

The rectifier 39 is similarly constructed and connected as that described with respect to the rectifier of FIG. 2. Consequently, the output of the rectifier 39 is connected in series aiding with the output of the exciter to provide a compensating excitation current in accordance with the induced voltage across the then connected winding 35 or 36.

The booster windings 35 and 36 are selected to provide a compensating excitation in the respective position of the switch 40 for establishment of optimum excitation of the revolving field 26.

Thus, in both the arc welding position and the power supply position of the control switch 30, a compensating excitation source is provided respectively by the power booster winding 35 and the arc welding booster winding 36. The power fed back is rectified by the rectifier 39 and added to the excitation current from the exciter 27. Thus, the total excitation current supplied to the revolving field 26 is maintained at a predesigned level to provide the proper and optimum excitation of the revolving field 26. Consequently, the welding output current and the power supply current are maintained at predetermined power ratings in a simple and readily operated manner.

FIG. 4 illustrates a further embodiment of the invention where the welding output is only adapted to provide direct current arc welding power. Consequently, the generator need not be driven at different speeds as the frequency of the alternating current supplied to the welding circuit is not particularly important.

The embodiment of the invention shown in FIG. 4 includes an A.C. generator 44 having a revolving field 45 connected to a separate exciter 46 by suitable slip rings 47 as in the previous embodiments. A power winding 48 and a separate weld winding 49 are individually and separately wound upon a stator, not shown, and are adapted to individually and separately supply alternating current for conventional power consumption and an alternating current which, as subsequently described, is rectified to provide direct current arc welding power. The use of separate windings 48 and 49 avoids a relatively expensive and large switch which would be required to properly interconnect a single winding in the high power ranges for which the present embodiment is particularly designed. The generator 44 is designed to be driven at a preselected constant speed for both supplying of power and for supplying of arc welding current.

A full-wave welding rectifier 50 has an input connected across the weld winding 49. An A.C. dropping inductance winding 51 is connected in series with the one lead between the full-wave rectifier 50 and the weld winding 49. A single-pole multiple-throw range switch 52 selectively connects the inductance 51 into the output circuit of generator 44.

The range switch 52 includes a pole or arm 53 which is connected directly to one side of the full-wave welding rectifier 50. The switch also includes a low-range contact 54 connected by a common lead to one end of the A.C. inductance winding 51 to connect substantially the complete winding into the circuit in the low welding current range. A second contact 55 of the switch 52 is connected to an intermediate portion of the A.C. inductance winding 51 to provide a lesser amount of A.C. inductance in the circuit to provide a high current range for arc welding.

D.C. welding terminals 56 are connected across the output of the full-wave welding rectifier 50 in series with a D.C. smoothing inductance 57.

The separate exciter 46, shown in FIG. 4 is similar to the exciter 27 shown in FIG. 3 and includes a shunt field 58 and a series field 59. The exciter 46 is selected to provide proper excitation of the revolving field 45 when the generator 44 is connected to supply conventional power current from the power winding 48. The power rating as a power supply is less than the power rating necessary for arc welding. Consequently, with the exciter 46 designed to supply proper excitation for supplying power current, the field 45 is improperly excited when operating the equipment to supply an arc welding current.

In accordance with the illustrated embodiment of the present invention, a winding extension 60 is formed on the inductance winding 51 and forms an auto transformer unit. A full-wave compensating rectifier 61 includes input terminals 62 connected respectively to the free end of the extension 60 of winding 51 and to the switch arm 53 of the range switch 52. The output of compensating rectifier 61 is connected in series with the output of the exciter 46.

When the generator 44 is employed to supply arc welding current, current flow through the winding 51 establishes a voltage across the extension 60 through auto transformer action and provides a current source to the rectifier 61.

With the switch arm 53 of switch 52 in contact with the low welding current range contact 54, winding 51 is connected in the circuit and induces a voltage in extension 60. In the illustrated embodiment, the extension 60 includes a smaller number of turns than winding 51 and a step-down auto transformer is formed. The extension winding 60 provides an adequate power source to increase the excitation current to the generator field 45 and establishes optimum field excitation when welding in the low current range.

In the high current position of switch 52, a small portion of the inductance winding 51 is connected in the welding power circuit. A substantial portion of winding 51 in series with extension 60 is connected across the input to the compensating rectifier 61. This establishes a stepped-up voltage transformation and a substantial additional field excitation compensating voltage. The output from the winding 50 and extension 60 is rectified by rectifier 61 and added to the D.C. output of the exciter 46 to establish optimum excitation of field 46 during welding in the high current range.

In summary, the embodiment of the invention illustrated in FIG. 4, the operation is as follows.

With the generator connected to supply power from the power winding 48, the field 45 is excited solely from the D.C. exciter 46 which is selected to provide the optimum excitation.

When employed as an arc welding current source, the switch 52 is positioned to provide either a high or a low welding current range. In either connection, the impedance winding 51 in combination with the extension 60 of winding 51 constitutes an auto transformer and establishes a current responsive source for maintaining optimum excitation of the revolving field 45.

The embodiment of the invention illustrated in FIG. 4 can be employed to simultaneously supply welding and A.C. power. The maximum A.C. power and the maximum welding current are however reduced below the separate ratings.

The present invention provides a combined arc welding and power supply generator having a separate excitation source and having a compensating means for maintaining the excitation of the revolving field of the generator at the optimum level for maximum performance at different speeds and/or power ratings. The present invention provides a low cost, readily constructed generator excitation circuit for providing maximum performance of a combined arc welding and power supply generator. Different frequency currents while maintaining full output capacity can be readily provided for. The armature of the generator and the exciter can be of a single basic design for a multiple purpose and a single purpose generator.

Various modes of carrying out the invention are contemplated as being within the scope of the following claims particularly pointing out and distinctly claiming the subject matter which is regarded as the invention.

We claim:

1. In a multiple purpose generator having a field and a separate exciter providing optimum excitation of the field for establishing a load output for only one purpose, a D.C. source adapted to be selectively connected in series between the output of the exciter and the field, switch means to selectively connect the D.C. source in circuit, and said D.C. source being selected to provide a compensating voltage when combined with the exciter output to maintain optimum field excitation of the field for a second generator purpose.

2. A revolving field generator for selectively supplying A.C. power of predetermined different characteristic load outputs with a field exciter for establishing optimum excitation of the revolving field at one output, which comprises excitation compensating means including a separate booster winding forming an output essentially independent of the load outputs of the generator, means connected to the compensating means to establish a D.C. voltage, and means to selectively connect the compensating means in circuit with the revolving field and the exciter to maintain optimum excitation of the field for each output.

3. In a combined arc welder and power supply generator for selectively supplying power and supplying welding current and having a revolving field and a separate exciter for exciting the revolving field, a D.C. source adapted to be selectively connected in series between the output of the exciter and the revolving field, and switch means to selectively connect said D.C. source in circuit and being selected to provide a compensating voltage when combined with the exciter output to maintain optimum field excitation of the revolving field when changing between supplying power and supplying welding current.

4. A revolving field generator for selectively supplying A.C. power of predetermined different frequencies in accordance with different speeds of the generator and having a field exciter driven in synchronism with the generator and establishing optimum excitation of the revolving field at a base speed, which comprises a rectifier having an output connected in series between the exciter and the field of the generator and having an input, said rectifier being polarized to pass the current from the exciter to the field, voltage compensating means connected to the output of the generator, and switch means to selectively connect the voltage compensating means to the input of the rectifier in accordance with a predetermined speed of the generator varying from the base speed to maintain optimum excitation of the revolving field for all generator speed.

5. In a combined arc welder and power supply generator having a revolving field and a separate exciter for exciting the revolving field, a full-wave rectifier having the output in series with the output of the exciter, booster winding means wound in common with the output winding means of the generator, and switch means to selectively connect the booster winding means to the input of the rectifier to establish a compensating field current which combines with the output of the exciter to maintain optimum field excitation of the revolving field when changing between supplying power and supplying welding current.

6. In a combined arc welder and power supply generator having a revolving field and a separate exciter providing excitation of the revolving field, a full-wave rectifier connected in series between the output of the exciter and the revolving field, a booster winding constituting a portion of the output of the generator, circuit switching means to selectively connect the booster winding to the rectifier to provide a compensating voltage when combined with the exciter output to maintain optimum field excitation of the revolving field when changing between supplying power and supplying welding current, and said rectifier including solid state rectifying elements adapted to withstand the peak voltage of the booster winding at maximum generator output.

7. A combined arc welder and power supply generator having a revolving field and a separate exciter for exciting the field for selectively supplying a first output having a predetermined frequency and a second output having higher frequency with the exciter providing optimum excitation when the second output is being supplied, a D.C. source having an output adapted to be connected in series between the revolving field and the exciter, and switch means connected to the D.C. source for selectively inserting the D.C. source in circuit with the output of the generator when supplying the first output and thereby establish and maintain optimum excitation of the revolving field.

8. An arc welder and power generator having a revolving field and an exciter driven in synchronism with the field and having an output winding on a stator for selectively supplying 60 cycle output for standby power and a higher frequency output for arc welding, a full-wave bridge rectifier having an input and having an output connected in series between the revolving field and the exciter and polarized to conduct the output of the exciter, a booster winding wound on the stator and connected to the input of said rectifier, switch means connected to the output of the generator and having an A.C. power position and an arc welding position, and switch means interposed between the rectifier and the booster winding and coupled to the first switch means to insert the booster winding in the excitation circuit incident movement to the A.C. power position.

9. An arc welder and power supply generator driven by an internal combustion engine and having a revolving field and an exciter driven in synchronism with the field and having an output winding means wound on a stator for selectively supplying 60 cycle output for standby power and a higher frequency output for arc welding, a full wave bridge rectifier having an input and having an output connected in series between the revolving field and the exciter and polarized to conduct the output of the exciter, a booster winding wound on the stator and connected to the input of said rectifier, a main switch connected to the output of the generator and having an A.C. power position and an arc welding position, and an auxiliary switch interposed between the rectifier and the booster winding and coupled to the main switch to insert the booster winding in the excitation circuit with the main switch in the A.C. power position, said bridge rectifier being constructed to carry the peak voltages established in the booster winding during establishment of the higher frequency output.

10. In a combined arc welder and power supply generator having a revolving field and a separate exciter for exciting the revolving field, a full wave rectifier having the output in series with the output of the exciter, booster winding means wound in common with the output winding means of the generator, and switch means to selectively connect a first portion of the booster winding means across the rectifier with the output winding connected to supply welding current and a second portion of the booster winding means across the rectifier with the output winding connected to supply power, said first and second portions of the booster winding means being selected to establish optimum excitation of the revolving field in accordance with the preselected speeds and power ratings of the generator in the two output connections.

11. In a combined arc welder and power supply generator having a revolving field and a separate exciter for exciting the revolving field, a full wave rectifier having the output in series with the output of the exciter, a booster winding wound in common with the output winding means of the generator and having an intermediate connection connected to an input terminal of the rectifier, and switch means connected to a second input terminal of the rectifier and to the opposite ends of the booster winding to selectively connect the booster winding to the input of the rectifier, the booster winding on opposite sides of the intermediate connection establishing compensating field excitation which combines with the output of the exciter to maintain optimum field excitation of the revolving field for supplying power and for supplying welding current, respectively.

12. In a combined arc welder and power supply generator having a revolving field and a separate exciter for exciting the revolving field, an output switch adapted to connect the generator for supplying arc welding current and for supplying power current, a full wave rectifier having the output in series with the output of the exciter, booster winding means wound in common with the output winding means of the generator, and switch means coupled to said output switch to selectively connect a first portion of the booster winding means across the rectifier with the output winding connected to supply welding current and a second portion of the booster winding means across the rectifier with the output winding connected to supply power, said first and second portions of the booster winding means being selected to establish optimum excitation of the revolving field in accordance with the preselected speeds and power ratings of the generator in the two output connections.

13. In a combined arc welder and power supply generator having a revolving field adapted to be driven at a speed for supplying 60 cycle power supply current and at a higher speed for supplying arc welding current and a separate exciter driven in synchronism with the revolving field and supplying inadequate field excitation for optimum excitation, an output switch adapted to condition the generator for supplying power current or arc welding current, a full wave rectifier having the output in series with the output of the exciter, booster winding means wound in common with the output winding means of the generator, switch means coupled to said output switch to selectively connect less than half the booster winding means across the rectifier with the output winding connected to supply welding current and a more than half the the booster winding means across the rectifier with the output winding connected to supply power, said first and second portions of the booster winding means being selected to establish proper excitation of the revolving field in accordance with the speeds and power rating of the generator in the two output connections, and said rectifier including rectifying elements adapted to withstand the peak operative voltages established in the booster winding with the switch means in the power supply condition and the revolving field rotating at arc welding speed.

14. In a combined arc welder and power supply generator having a revolving field adapted to be driven at a constant speed, a pair of stator windings for individually supplying welding current and power current, a separate exciter for said revolving field establishing optimum field excitation to the generator when supplying power current, an A.C. inductive impedance in series circuit with the weld winding of said pair of stator windings, and a full wave rectifier having an input connected across a boosting portion of the A.C. inductive impedance and having an output connected in series with the output of the exciter, said boosting portion constituting an auto transformer secondary establishing a compensating excitation current to maintain optimum excitation of the revolving field when using the generator for arc welding.

15. In a combined arc welder and power supply generator having a revolving field adapted to be driven at a constant speed, a pair of stator windings for individually supplying welding current and power current, a separate exciter for said revolving field establishing optimum field excitation to the generator when supplying power current, a dropping impedance in series circuit with the weld winding of said pair of stator windings, an extension winding on said dropping impedance, and a full wave rectifier having an input connected across said extension and having an output connected in series with the output of the exciter, said extension winding establishing a compensating excitation current to maintain optimum excitation of the revolving field when using the generator for arc welding.

16. In a combined arc welder and power supply generator having a revolving field adapted to be driven at a constant speed, a pair of stator windings for individually supplying welding current and power current, a separate exciter for said revolving field establishing optimum field excitation to the generator when supplying power current, a current range inductive impedance in series circuit with the weld winding of said pair of stator windings, a switch adapted to couple preselected portions of the impedance in the welding circuit, an extension winding of said inductive impedance, and a full wave rectifier having an input connected across the portion of the impedance not in the welding circuit and said extension and having an output connected in series with the output of the exciter, the output of the rectifier establishing a compensating excitation current to maintain optimum excitation of the revolving field when using the generator for arc welding.

17. In a combined arc welder and power supply generator having a revolving field adapted to be driven at a constant speed, a pair of stator windings for individually supplying welding current and power current, a separate exciter for said revolving field establishing optimum field excitation to the generator when supplying power current, and a separate D.C. source connected in series with the output of the exciter when the generator is supplying weld current, said D.C. source being selected to maintain optimum field excitation of the revolving field.

18. In a combined arc welder and power supply generator having a revolving field adapted to be driven at a constant speed and having output windings on a stator for supplying welding current and power current, a separate exciter for said revolving field establishing proper field excitation to the generator when supplying power current, an A.C. impedance connected to the output winding for supplying welding current, rectifying means energized from said impedance and connected in series with the output of the exciter when the generator is supplying weld current to supply a compensating field excitation.

19. An arc welder and power generator having a revolving field and an exciter driven in synchronism with the field and having an output winding means wound on a stator, a prime mover having a speed control member and coupled to drive the field and the exciter at one speed for a welding operation and at another speed for a power operation, a full-wave bridge rectifier having an input and having an output in series between the revolving field and the exciter and polarized to conduct the output of the exciter, a booster winding means on the stator and connected to the input of said rectifier, and switch means interposed between the rectifier and the booster winding and coupled to the speed control member to open and close the included circuit in accordance with the positioning of the speed control member.

References Cited in the file of this patent

UNITED STATES PATENTS

| 2,531,062 | LeTourneau | Nov. 21, 1950 |
| 2,773,233 | Marcks | Dec. 4, 1956 |
| 2,883,608 | Smith | Apr. 21, 1959 |

FOREIGN PATENTS

| 1,050,847 | France | Sept. 9, 1953 |